May 27, 1969  L. O. KNUDSON  3,445,931
CUTLERY DRESSING TOOL
Filed June 29, 1966
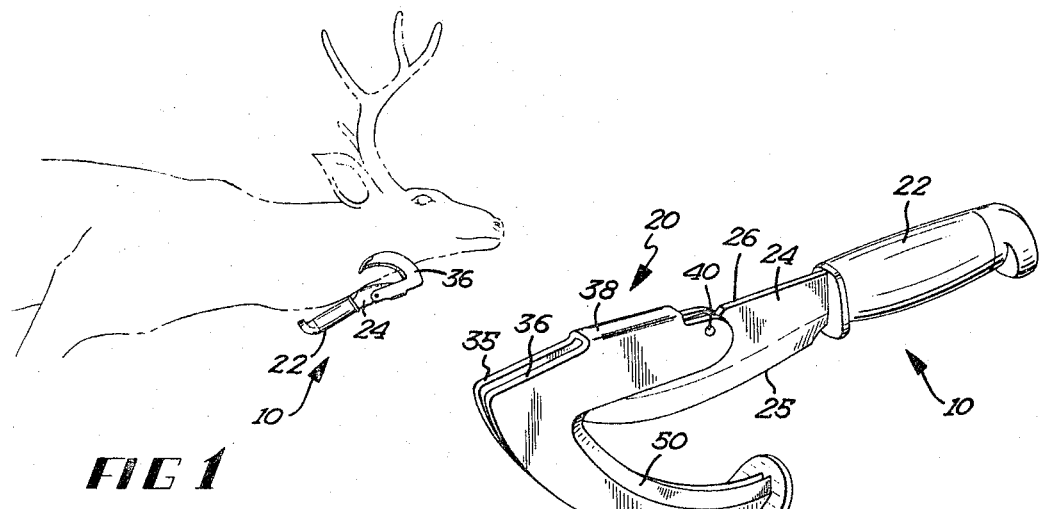
FIG 1
FIG 2
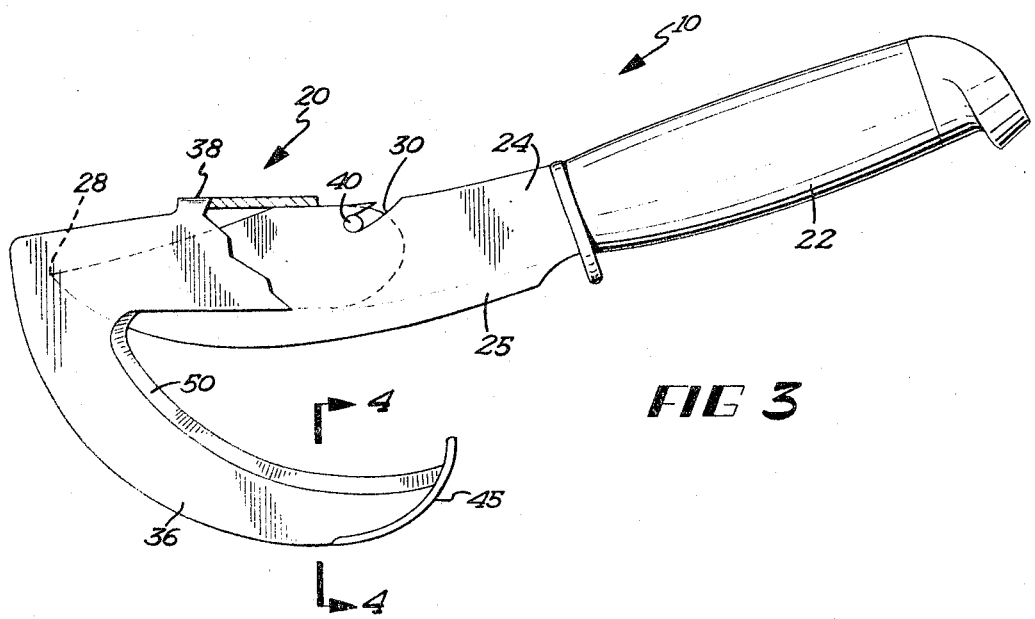
FIG 3
FIG 4
INVENTOR.
LESTER O. KNUDSON
BY Schroeder, Siegfried
& Ryan  ATTORNEYS United States Patent Office
3,445,931
Patented May 27, 1969

3,445,931
CUTLERY DRESSING TOOL
Lester O. Knudson, 713 W. Washington St.,
Lewistown, Mont. 59457
Filed June 29, 1966, Ser. No. 561,605
Int. Cl. B26b 1/00
U.S. Cl. 30—287                                    7 Claims

ABSTRACT OF THE DISCLOSURE

A cutlery dressing tool which combines a knife having a handle and blade with a cutting edge extending over one edge of the same which cooperates with a cutting attachment generally C-shaped in form and having curved bifurcated form with knife edges over partial extent of the same which cooperate with the cutting edge of the knife to provide a shear type cutting action.

This invention relates to a cutlery dressing tool and more particularly to an improved cutlery dressing tool particularly adapted for removing entrails from the carcasses of animals.

The problem of disemboweling or gutting carcasses of animals in the dressing of the same is well known. In the slaughtering and meat packaging industry, special dressing tools have been utilized in the past which prevent severing of the intestines during this operation for the specific purpose of preventing mutilation of such intestines so that they may be preserved for future use. In the sporting field, a similar problem exists in the gutting of animals. In this field the primary purpose is that of preserving the carcass through removal of the intestines to facilitate cooling of the carcass. In addition the intestines or entrails are preferably not severed so as to prevent release of material which might affect the quality of the meat. The problem of removing such entrails and opening the stomach cavity for cooling purposes normally requires tools other than a knife and a certain amount of relatively disagreeable hand removal of entrails. In addition, this work normally requires the effort of more than one person to handle the carcass during dressing of the same. In the dressing of slaughtered animals, whether in the field or in commercial slaughtering operations, it is conventional to hang such animals with the head down and start the opening operation at the crotch or rear portion of the stomach.

The present invention is directed to an improved dressing tool which is easy to use and facilitates opening of a carcass while it is lying on the ground. The tool may be readily inserted into an opening in the carcass, preferably at the neck, and with the simple procedure of drawing the tool with the knife therein along the chest and belly of the carcass a complete opening of the stomach and chest cavity is obtained severing cartilage and bone tissue in the chest and pelvic regions and facilitating complete removal of the entrails without further equipment or procedure. This improved cutlery dressing tool utilizes a conventional knife in combination with an attachment having a cooperating cutting surface thereon to provide a shear type action and a displacement of the entrails so that the combined structure may be readily drawn across the underside of the carcass in the gutting operation. Such an improved tool is particularly useful in the field in connection with dressing of game animals where special severing equipment is not available and the need for completely opening the carcass is desired to remove the entrails and spread the carcass sides to facilitate rapid cooling of the carcass in the preservation of the meat.

Therefore it is the principal object of this invention to provide an improved cutlery dressing tool.

Another object of this invention is to provide a small compact tool of this type particularly adapted for field use in the dressing of game animals.

A further object of this invention is to provide a cutlery dressing tool having an attachment which pivots on a knife blade and provides a shear cutting action to enable severing of tissue and cartilage in the gutting operation.

A still further object of this invention is to provide a cutlery dressing tool which is easy to use and maintain.

These and other objects of this invention will become apparent from a reading of the attached description together with the drawings wherein:

FIGURE 1 is a schematic diagram of the improved cutlery dressing tool shown in conjunction with a carcass of an animal, in phantom, to show an application of the same, FIGURE 2 is a perspective view of the improved cutlery dressing tool, FIGURE 3 is a plan view of the cutlery dressing tool, and FIGURE 4 is a sectional view of the portion of the tool taken along the lines 4—4 in FIGURE 3.

My improved cutlery dressing tool, which is shown schematically in FIGURE 1, is particulary adapted for field use for the purpose of gutting game animals. Its physical size makes it easy to carry and readily facilitates splitting of an animal carcass for the purpose of removing entrails therefrom and opening the carcass for cooling to preserve the carcass of the game animal. The tool is comprised of a conventional knife such as a hunting knife, indicated generally at 10 and a cutting attachment, indicated generally at 20, which connect or mount together to provide a dual cutting surface with a scissors or shear type action enabling the same to cut through heavy cartilage, light bone structure and portions of the animal carcass which are difficult or impossible to cut with only a conventional knife.

The conventional cutting knife, as shown in the drawings, may take varying shapes or forms. It is comprised of a handle 22 and a blade 24 connected thereto with the blade having a cutting edge or side 25 and a broad back side 26 which taper together at the extremity remote from the handle to define a point tip 28. Such a knife in the field may be readily carried in a sheath (not shown) for other applications or uses with the attachment 20 separate therefrom. The blade 24 of the knife has a notch 30 which starts at the broad back side 26 of the same and slopes in the direction of the tip of the knife. As will be hereinafter described, this notch forms a portion of a pivot for the attachment 20. With a conventional hunting knife, such a notch may be machined or filed into the back edge of the same to modify a conventional knife for this application.

The cutting attachment 20 is a generally C-shaped structure, bifurcated in form, to define a pair of sides 35, 36 which are connected together by a portion 38 at one extremity. Such a structure may be stamped from a heavy metal which will later be tempered to harden the cutting surfaces, as will be hereinafter defined. The structure of the attachment defined by the sides 35, 36 has a generally straight portion designed to fit over the back of the knife and extend over the extent of the same to protect the tip as will be seen in the drawings. Near the extremity of this straight portion is positioned a pin 40 which extends between the sides and is suitably secured therein. It is of such diametrical dimension so as to fit into the notch 30 and pivot the attachment 20 on the blade 24 of the knife. The pin is so positioned in the C- shaped structure that the connecting portion 28 will rest on the back side of the knife defining a stop for the same. From the straight portion of the bifurcated sides, the stamped sides are curved back on themselves to define a generally C-shaped form and terminate in a transversely extending curved plate 45 which is suitably connected to the sides 35, 36 by means such as welding (not shown). The plate 45 is curved toward the pin extremity of the attachment and provides a smooth generally elliptical surface adapted to slide inside the carcass and displace entrails therein so that the knife blade will not come in contact with the same. The curved portion of the sides 35, 36 each have knife or cutting edge surfaces 50 maintained therein which will extend from the curved plate 45 to the straight portion and will always be in cooperative relationship with the cutting edge 25 of the knife to provide a shear cutting action from the improved tool. After assembly, the cutting attachment will be tempered and heat treated to harden the cutting surface so that when the blade 24 of the knife is positioned between the bifurcated sides of the attachment, with the pin 40 in the notch 30, the cutting surfaces will cooperate in the manner described. The attachment is designed to permit pivoting of the knife blade therein such that a cutting edge of the knife will always be in cooperative cutting relationship with the knife surfaces or cutting surfaces 50 of the bifurcated sides 35, 36. Further the slope or curvature of the curved portions of the sides 35, 36 is such that the tip will always be positioned between the sides and will not project beyond the same so as not to cut any entrails or intestines of the animal being dressed. The actual spacing of the sides 35, 36 is such that the knife blade may snugly but movably be positioned therein to permit pivoting action which will take place as the tool is used. The attachment 20 may be readily removed from the blade by simply sliding the pin 40 out of the notch. Thus the attachment may be carried or stored separately and used only during a dressing operation.

In the use of the improved cutlery dressing tool, the tip of the blade on the knife will first be used to puncture or start a hole in an animal carcass sufficiently large enough to permit entrance of the attachment of the flange end of the same. In field dressing of game animals, it is desired to split the carcass and particularly the bone and cartilage structure in such a manner that the animal carcass will be open from the chest through the pelvic region for ready removal of the entrails. With this improved cutlery dressing tool, a single person may dress an animal in the field without further equipment merely by positioning the animal on its back or side and making a hole in the carcass at the neck portion, as indicated in FIGURE 1. Thereafter the cutting attachment will be mounted on the blade and the extremity having the curved flange plate 45 will be inserted into the opening and underneath the bone structure at the chest of the animal. Since the connecting portion 38 of the attachment rests against the back side 26 of the knife blade, the flanged extremity may be raised within the chest cavity so that the flange will displace the entrails as the knife and attachment are drawn through the carcass. By centering the opening or insertion for the tool and drawing the knife down the center of the rib cage and stomach, the cartilage portion of the bone structure will be severed by the cooperative cutting surfaces of the knife blade 25 and the cutting edges 50 of the attachment in a scissors or shear action without exposing the entrails to the knife blade. Such a cutting stroke will continue across the stomach cavity and into the pelvic region where the pelvic bone will also be split in the same manner opening the entire carcass. With such an opening, the entrails will normally remove themselves by falling out of the carcass with a minimum amount of effort on the part of the user to complete the gutting or dressing operation.

It will be evident that this improved cutlery dressing attachment may be readily used in connection with slaughtering operations of domestic animals wherein the carcasses are normally suspended by the rear legs and shackled. The principal object of this operation is to sever the carcass in varying degrees to remove the entrails without severing the same so that extraneous material therein will not be released into the stomach cavity to disturb or taint the quality of the meat product as well as preserve the entrails for additional usage in connection with meat packing operations.

This improved cutlery dressing attachment may be readily used, stored and carried for a variety of uses to simplify the dressing of animals. Additional equipment such as saws or heavy bladed cleavers are not necessary for cutting through heavy cartilage material or bone structure. The improved cutlery dressing tool may vary in form with respect to the hunting knife and the shape of the connecting portion of the attachment, as well as the flange plate.

Therefore in considering this invention it should be remembered that the present disclosure is intended to be illustrative and the scope of the invention should be determined by the appended claims.

What is claimed is:

1. A cutlery dressing tool comprising, a knife having a handle and a blade with a cutting edge extending on one side thereof generally from the handle to the opposite extremity and terminating in a point tip, a notch in the side of the blade opposite the cutting edge, a cooperative cutting attachment having a bifurcated frame generally C-shaped in form with a pin across one extremity of the same and a connected portion with a transverse platelike guide surface at the other extremity of the same, said bifurcated frame having knife edge surfaces on the bifurcated sides extending over part of the extent of the frame from said other extremity, said knife being adapted to be placed between the sides of the bifurcated frame with the pin extremity positioned in said notch such that the cutting edge of the blade cooperates with the knife edge surfaces of the frame.

2. The cutlery dressing tool of claim 1 in which the blade of the knife is substantially straight along its extent and aligned with the handle and in which the notch in the blade is located intermediate the extent of the blade at the edge thereof and closest to the handle.

3. The cutlery dressing tool of claim 2 in which the notch in the blade of the knife extends from the side of the blade remote from the cutting edge into the blade and toward the tip.

4. The cutlery dressing tool of claim 3 in which the knife blade has a substantially straight edge opposite the cutting edge and the cutting attachment has a straight back portion adjacent the pin extremity of the same and a curved portion extending therefrom to the other extremity of the attachment to define the C-shaped form with the pin when positioned in the notch affecting a pivot motion of the attachment on the blade.

5. The cutlery dressing tool of claim 4 in which the knife edge surfaces of the bifurcated frame are positioned on the curved portion of the same and tapered in the direction of the knife surface to cooperate therewith in a shear type cutting action.

6. The cutlery dressing tool of claim 5 in which the straight portion of the cutting attachment extends beyond the tip of the knife blade when the attachment is positioned on the knife blade with the pin placed in the notch of the knife blade and in which the curved portion of the cutting attachment is sloped to extend beyond the tip of the knife blade as the blade is pivoted in the attachment.

7. The cutlery dressing tool of claim 1 in which the cutting attachment is shaped relative to the length of the knife blade from the notch such that when the pin is positioned in the notch and the attachment is pivoted relative to the knife blade the tip of the knife blade will always be between the sides of the bifurcated frame and the cutting edge of the knife blade will always be positioned adjacent and in cooperating relationship with the knife edge surfaces of the attachment.

References Cited

UNITED STATES PATENTS

| 1,137,445 | 4/1915 | Allais | 30—317 |
| 1,329,912 | 2/1920 | Lewis | 30—299 |
| 1,397,691 | 11/1921 | Lefebvre | 30—287 |
| 1,493,484 | 5/1924 | Enholdt | 30—294 |
| 2,662,287 | 12/1953 | Ferguson | 30—287 |
| 2,681,506 | 6/1954 | Tipple | 30—317 |
| 2,833,032 | 5/1958 | Aciego | 30—299 X |

MYRON C. KRUSE, *Primary Examiner.*

U.S. Cl. X.R.

30—294, 333, 349